(12) United States Patent
Baillargeon et al.

(10) Patent No.: US 10,890,567 B2
(45) Date of Patent: Jan. 12, 2021

(54) METHOD AND CHROMATOGRAPH TO ACQUIRE AND DISPLAY REAL-TIME CHROMATOGRAM USING TIME-STAMPED MESSAGES

(71) Applicant: SIEMENS AKTIENGESELLSCHAFT, Munich (DE)

(72) Inventors: Michel J. Adrien Baillargeon, Bartlesville, OK (US); Aosheng Wang, Eden Prairie, MN (US)

(73) Assignee: SIEMENS AKTIENGESELLSCHAFT, Munich (DE)

(*) Notice: Subject to any disclaimer, the term of this patent is extended or adjusted under 35 U.S.C. 154(b) by 428 days.

(21) Appl. No.: 15/580,555

(22) PCT Filed: Jun. 7, 2016

(86) PCT No.: PCT/US2016/036129
§ 371 (c)(1),
(2) Date: Dec. 7, 2017

(87) PCT Pub. No.: WO2016/200756
PCT Pub. Date: Dec. 15, 2016

(65) Prior Publication Data
US 2018/0224410 A1    Aug. 9, 2018

Related U.S. Application Data

(60) Provisional application No. 62/173,684, filed on Jun. 10, 2015.

(51) Int. Cl.
*G01N 30/86* (2006.01)
*G01N 30/62* (2006.01)
*H04J 3/06* (2006.01)

(52) U.S. Cl.
CPC ......... *G01N 30/8651* (2013.01); *G01N 30/62* (2013.01); *G01N 30/8658* (2013.01); *H04J 3/0673* (2013.01)

(58) Field of Classification Search
CPC ............... G01N 30/8651; G01N 30/62; G01N 30/8658; H04J 3/0673
See application file for complete search history.

(56) References Cited

U.S. PATENT DOCUMENTS

2004/0230381 A1* 11/2004 Ito ........................... G06F 17/10
                                                                    702/32
2007/0089484 A1* 4/2007 Bailey ................... G01N 30/88
                                                                    73/23.42

(Continued)

FOREIGN PATENT DOCUMENTS

CN        101855548 A       10/2010
CN        102735765 A       10/2012

(Continued)

OTHER PUBLICATIONS

PCT International Search Report and Written Opinion of International Searching Authority dated Sep. 21, 2016 corresponding to PCT International Application No. PCT/US2016/0361298 filed Jun. 7, 2016.

*Primary Examiner* — Mohamed Charioui
*Assistant Examiner* — Christine Y Liao

(57) ABSTRACT

A chromatograph and a method of acquiring and displaying a real-time chromatogram using time-stamped asynchronous messaging are provided. The method includes generating a chromatogram of a sample, acquiring segments of data points of the chromatogram in real-time, annotating in real-time the segments of data points of the chromatogram with timing stamps of cycle events of an analysis cycle using time-stamped event messages, receiving the time-stamped event messages asynchronously and displaying each cycle (Continued)

event of the cycle events of the analysis cycle and each segment of the segments of data points of the chromatogram in a display module as being received.

20 Claims, 4 Drawing Sheets

(56) References Cited

U.S. PATENT DOCUMENTS

| | | | |
|---|---|---|---|
| 2012/0052142 A1* | 3/2012 | Gnabre | A61K 31/357 424/777 |
| 2012/0290266 A1 | 11/2012 | Jain et al. | |
| 2015/0082325 A1* | 3/2015 | Aharonov | G06F 9/4825 719/318 |

FOREIGN PATENT DOCUMENTS

| | | |
|---|---|---|
| JP | 2005221405 A | 8/2005 |
| WO | 2013085680 A1 | 6/2013 |
| WO | 2014059092 A1 | 4/2014 |

\* cited by examiner

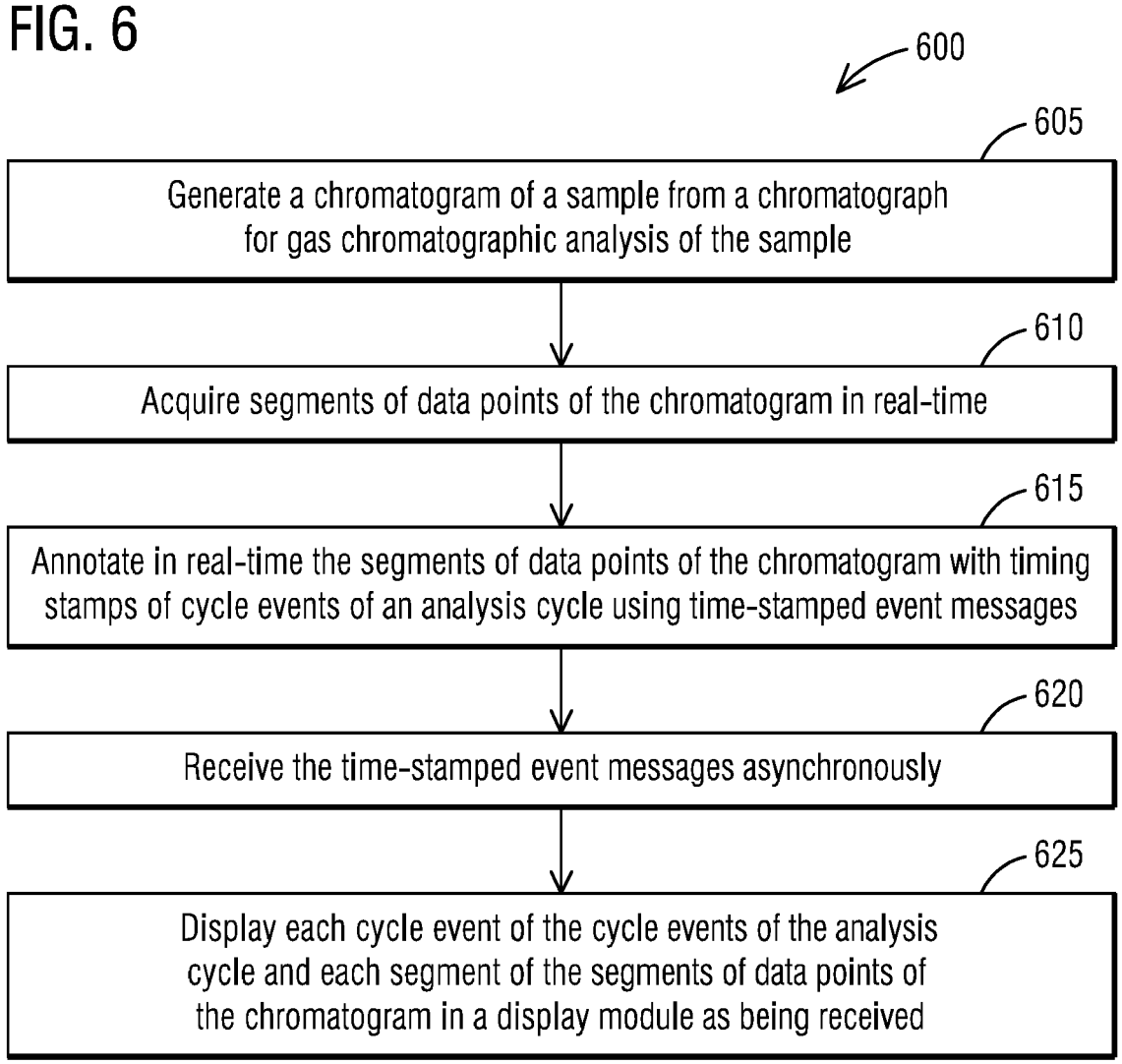

METHOD AND CHROMATOGRAPH TO ACQUIRE AND DISPLAY REAL-TIME CHROMATOGRAM USING TIME-STAMPED MESSAGES

CROSS REFERENCE TO RELATED APPLICATION

This application claims the benefit of priority under 35 U.S.C. § 119(e) of U.S. Provisional Application No. 62/173,684 entitled "TIME-STAMPED ASYNCHRONOUS MESSAGING FOR REAL-TIME CHROMATOGRAM", filed on Jun. 10, 2015, which is incorporated herein by reference in its entirety.

BACKGROUND

1. Field

Aspects of the present invention generally relate to a chromatograph and a method of time-stamped asynchronous messaging for acquiring and displaying a real-time chromatogram and more specifically relates to communicating the real-time chromatograms and associated cycle events information to a display module with a minimal impact on the critical real-time activity.

2. Description of the Related Art

Automation technology contributes decisively to the continuous optimization of company-wide processes. Integrated automation may be provided via automation systems in the manufacturing and process industry. For automation, a process control system provides solutions for all sectors of the production, process and automation of the entire process chain of a company. A process control system may use sensor systems which provide precise measurement results and the reliable control of all processes. Process analytics is done by process analyzers and process analysis systems. Process analyzers include continuous gas analyzers and process gas chromatographs.

Process gas analyzers are used for continuous calculation of concentration values of one or more gases in a gas mixture for controlling and monitoring process flows. Process gas analyzers use different physical or electro-chemical measuring methods depending on the task. Process gas analyzers have been used in the process industry for decades. Continuous process gas analysis with both extractive and in-situ analysis techniques is done.

Process gas chromatography is one of the most powerful measuring and analysis methods for process engineering. It is a procedure which is both discrete and extractive. This procedure is frequently used for online monitoring of processes since the sequences are easy to automate and a large number of components can be measured simultaneously. Process gas chromatography can be used to separate and quantify the components of almost all homogenous gaseous or liquid mixtures. It must be possible to vaporize the liquid components without decomposition. The individual components of a discrete sample pass through the column system at different velocities, and are recorded in succession by a detector.

Optimizing timings of hardware control (cycle events) in a chromatograph is an important part of chromatographic method development. Real-time chromatogram and cycle event timing marks are often desired for displaying chromatogram data points as soon as they are being acquired without having to wait for the end of current analysis cycle. The display of real time chromatograms and associated cycle events many a times not accomplished in a manner which has a minimal impact on the critical real-time activity related to chromatogram acquisition and instrument control.

Real-time chromatogram annotated with cycle event timing marks is not available on GC analyzers today. Non-real-time (static and complete) chromatogram with cycle event timing marks is often used as an alternative. However, one has to wait for the end of cycle to view the complete chromatogram and its related cycle event timing marks annotated on the same chromatogram and then to change cycle event timings as needed for next analysis cycle, which slows down the method development process.

The real-time chromatogram cycle event information can be communicated synchronously to a display task but this approach adversely affects the critical real-time process. Alternatively, the real-time chromatogram information can be communicated periodically, using an asynchronous protocol. This approach adds complexity, and associated overhead to the critical real-time task as the information needs to be accumulated and managed by a real-time process.

Therefore, there is a need for improvements in communicating the real-time chromatogram information and the associated real-time chromatogram cycle event information in a manner which has a minimal impact on the critical real-time activity related to chromatogram acquisition and instrument control.

SUMMARY

Briefly described, aspects of the present invention relate to a mechanism for acquiring and displaying a real-time chromatogram using time-stamped asynchronous event messages to improve productivity of chromatographic method development. A chromatograph for gas chromatographic analysis of a sample provides an efficient method for acquiring and displaying a real-time chromatogram by using time-stamped event messages with a standard asynchronous messaging system. The chromatograph includes an evaluation device having a chromatographic software module including a real-time software module for a data acquisition system coupled to an asynchronous messaging system and a non-real-time software module for a chromatogram display. One of ordinary skill in the art appreciates that such a chromatograph can be configured to be installed in different environments where real-time data acquisition and display of a real-time chromatogram is needed, for example, based on time-stamped asynchronous event messages.

In accordance with one illustrative embodiment of the present invention, a method of acquiring and displaying a real-time chromatogram is provided. The method comprises generating the chromatogram of a sample, acquiring segments of data points of the chromatogram in real-time, annotating in real-time the segments of data points of the chromatogram with timing stamps of cycle events of an analysis cycle using time-stamped event messages, receiving the time-stamped event messages asynchronously and displaying each cycle event of the cycle events of the analysis cycle and each segment of the segments of data points of the chromatogram in a display module as being received.

In accordance with another illustrative embodiment of the present invention, a chromatograph for gas chromatographic analysis of a sample is provided. The chromatograph comprises a separating device having a downstream detector and an evaluation device coupled to the detector. The sample being conveyed by a carrier gas through the separating device. The detector delivering a chromatogram of the sample. The evaluation device having a chromatographic software module including a real-time software module for a data acquisition system coupled to an asynchronous messaging system and a non-real-time software module for a chromatogram display. The data acquisition system is configured for acquiring segments of data points of the chromatogram in real-time and the real-time software module is configured for annotating in real-time the segments of data points of the chromatogram with timing stamps of cycle events of an analysis cycle. The real-time software module is configured for publishing in real-time each cycle event of the cycle events of the analysis cycle and each segment of the segments of data points of the chromatogram as a message stamped with an event time or a data acquisition time to the asynchronous messaging system, the non-real-time software module is registered as a message listener to the asynchronous messaging system. The real-time software module is configured for communicating the each cycle event of the cycle events of the analysis cycle and the each segment of the segments of data points of the chromatogram as the message to the non-real-time software module so that the chromatogram display to display a partial data points of the segments of data points of the chromatogram as soon as they are being acquired such that cycle event timings in a chromatographic method be changed, as needed, to prepare for a next analysis cycle.

In accordance with yet another illustrative embodiment of the present invention, a chromatograph for gas chromatographic analysis of a sample is provided. The chromatograph comprises a real-time software module for a data acquisition system coupled to an asynchronous messaging system and a non-real-time software module for a display. The data acquisition system is configured for acquiring segments of data points of a chromatogram in real-time and wherein the real-time software module is configured for annotating in real-time the segments of data points of the chromatogram with timing stamps of cycle events of an analysis cycle using time-stamped event messages. The non-real-time software module is configured to receive the time-stamped event messages asynchronously from the asynchronous messaging system for displaying each cycle event of the cycle events of the analysis cycle and each segment of the segments of data points of the chromatogram in the display as a partial data points of the segments of data points of the chromatogram in real-time as being received.

BRIEF DESCRIPTION OF THE DRAWINGS

FIG. 6 illustrates a flow chart of a method of acquiring and displaying the real-time chromatogram of FIG. 2 from the process gas chromatograph of FIG. 1 using time-stamped asynchronous event messages in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of a chromatograph for gas chromatographic analysis of a sample by acquiring and displaying a real-time chromatogram using time-stamped asynchronous event messages. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
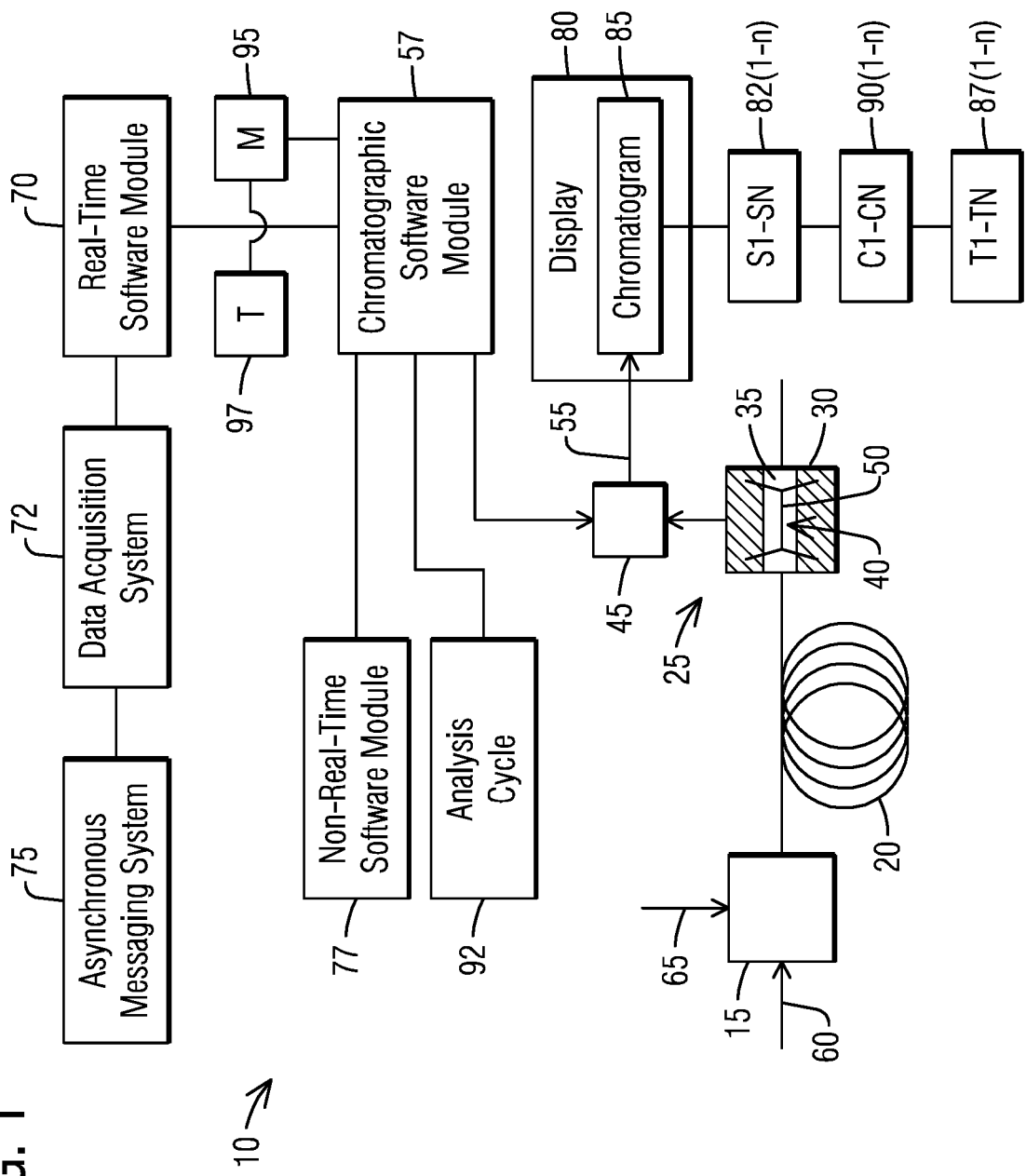
FIG. 1 illustrates a simplified schematic block diagram of an exemplary process gas chromatograph in accordance with an exemplary embodiment of the present invention.

FIG. 1 illustrates a simplified schematic block diagram of an exemplary process gas chromatograph 10 (PGC) or a GC analyzer in accordance with an exemplary embodiment of the present invention. The process gas chromatograph 10 comprises an injector 15 coupled to a separating device 20. The separating device 20 is coupled to a thermal conductivity detector 25. The thermal conductivity detector 25 includes a measuring cell 30 having a measurement channel 35 and a detector element 40 such as an electrically heated heating filament. The thermal conductivity detector 25 further includes an evaluation device 45 where a change in the electrical resistance of a heating filament 50 is detected. To this end, the heating filament 50 may be arranged in a measurement bridge in a manner known per se (not shown). The evaluation device 45 provides an output 55 that indicates the presence and amount of the gas components.

As used herein, "a GC analyzer" refers to a device used for process gas chromatography for measuring and analysis of chemical components in process engineering. The GC analyzer is capable of a procedure which is both discrete and extractive. The GC analyzer may be used for online monitoring of processes since the sequences are easy to automate and a large number of components can be measured simultaneously. The "GC analyzer," in addition to the exemplary hardware description above, refers to a system that is configured to separate and quantify the components of almost all homogenous gaseous or liquid mixtures. The GC analyzer can include multiple interacting systems, whether located together or apart, that together perform processes as described herein.

The process gas chromatograph 10 may analyze a vapour or a volatile liquid sample and then separates the various chemical components in the sample for individual detection and measurement. The discrete separation and positive identification of components and measurement of the composition enables the process gas chromatograph 10 to minimize the likelihood of cross interference during measurement. The process gas chromatograph 10 may also measure multiple chemical compounds during each analysis to levels that reach parts-per-million and even parts-per-billion levels. The process gas chromatograph 10 may monitor a chemical component in a process environment to detect a peak of the chemical component in a current cycle of a process stream to identify an associated chemical component being monitored.

In operation, in the process gas chromatograph 10, a carrier gas 60 is delivered to the injector 15, loaded there with a sample of a gas mixture 65 to be analyzed and subsequently introduced into the separating device 20 such as a single separation column or a complete system of separation columns. The separated components or substances of the gas mixture 65 emerging successively from the separating device 20 travel to the thermal conductivity detector 25. Here, the separated gas components are conveyed in the measurement channel 35 of the measuring cell 30 past the detector element 40. Depending on the thermal conductivity of the gas components respectively flowing past in comparison with that of the carrier gas 60, more or less heat is transferred from the heating filament 50 to the channel wall so that the heating filament 50 is correspondingly cooled or heated. As a result, the electrical resistance of the heating filament 50 changes, where the change is detected in the evaluation device 45 of the thermal conductivity detector 25. The evaluation device 45 provides the output 55 that indicates the presence and amount of the gas components passing the heating filament 50.

The evaluation device 45 includes a chromatographic software module 57 including a real-time software module 70 for a data acquisition system 72 coupled to an asynchronous messaging system 75 and a non-real-time software module 77 for a chromatogram display 80. The data acquisition system 72 is configured for acquiring segments of data points S1-SN 82(1-n) of a chromatogram 85 in real-time and the real-time software module 70 is configured for annotating in real-time the segments of data points S1-SN 82(1-n) of the chromatogram 85 with timing stamps T1-TN 87(1-n) of cycle events C1-CN 90(1-n) of an analysis cycle 92.

The chromatogram 85 is a visible record (such as a series of colored bands or a graph of peaks) showing the result of separation of the components of a mixture by chromatography. The magnitude of a detector signal is a measure of the volume concentration of the component in the gas or liquid.

The real-time software module 70 is configured for publishing in real-time each cycle event C of the cycle events C1-CN 90(1-n) of the analysis cycle 92 and each segment S of the segments of data points S1-SN 82(1-n) of the chromatogram 85 as a message (M) 95 stamped with an event time or a data acquisition time (T) 97 to the asynchronous messaging system 75. The non-real-time software module 77 may be registered as a message listener to the asynchronous messaging system 75.

The real-time software module 70 is further configured for communicating the each cycle event C of the cycle events C1-CN 90(1-n) of the analysis cycle 92 and the each segment S of the segments of data points S1-SN 82(1-n) of the chromatogram 85 as the message 95 to the non-real-time software module 77 so that the chromatogram display 80 to display a partial data points S1-S3 82(1-3) of the segments of data points S1-SN 82(1-n) of the chromatogram 85 as soon as they are being acquired such that cycle event timings in a chromatographic method be changed, as needed, to prepare for a next analysis cycle 99.

In the chromatographic software module 57, the real-time software module 70 is used for cycle events C1-CN 90(1-n) and chromatogram data acquisition and the non-real-time software module 77 is used for the chromatogram display 80. Because of hard real-time requirements in the real-time software module 70, any cycle events C1-CN 90(1-n) or chromatogram data sent from the real-time software module 70 to the non-real-time software module 77 is preferably to be fast. The consumptions of these events or data in the non-real-time software module 77 being a non-real-time display module software may be slow, but a delay of a second or two in the chromatogram display 80 is tolerable to a human reading the display. The delay in a display module is common either due to slow communication, such as inter-process communication (local Human Machine Interface (HMI) in the chromatograph) or inter-machine communication (remote HMI on a workstation PC), or due to additional data processing required before displaying the data, such as peak analysis or statistical analysis on the available portion of the chromatogram 85, but the delay preferably does not affect the real-time performance of the real-time software module 70.

In operation, each cycle event C of the analysis cycle 92 and each segment of chromatogram data points S1-S3 82(1-3) just acquired are all published in real-time from the real-time software module 70 as the message 95 stamped with the event time or data acquisition time 97 to the asynchronous messaging system 75, where the non-real-time software module 77, registered as one of the message listeners to the asynchronous messaging system 75, receives the message 95 asynchronously. Any available cycle events C and chromatogram segments S may be processed and displayed in the chromatogram display 80 as they are being received. Multiple non-real-time software modules, such as local HMI and remote HMI, may be registered as message listeners simultaneously.

Consistent with one embodiment, the chromatographic software module 57 of time-stamped asynchronous messaging for real-time chromatogram may also be used for acquiring and displaying other types of real-time data, such as real-time temperature and pressure profiles. These real-time data may be overlaid with a real-time chromatogram to provide additional information for optimizing a chromatographic method, such as temperature and pressure programming.

The chromatographic software module 57 may be used to separate and quantify the components of almost all homogenous gaseous or liquid mixtures. It must be possible to vaporize the liquid components without decomposition. The individual components of a discrete sample pass through the column system at different velocities, and are recorded in succession by a detector. The chromatographic software module 57 may be applied to any types of process chromatographs, such as process gas chromatographs and process liquid chromatographs.

Figure 2:
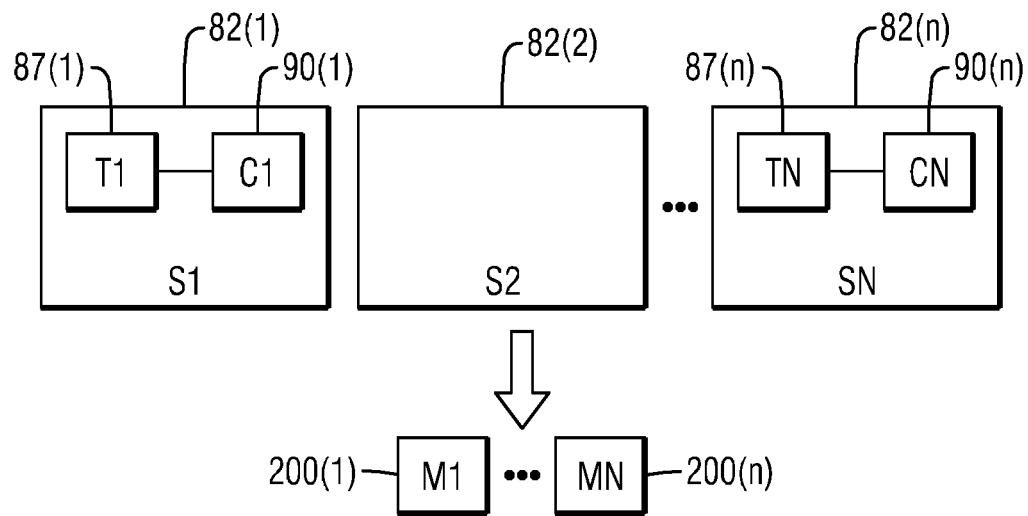
FIG. 2 illustrates a schematic of annotating in real-time segments of data points of a chromatogram with timing stamps of cycle events of an analysis cycle in accordance with an exemplary embodiment of the present invention.

Referring to FIG. 2, it illustrates a schematic of annotating in real-time the segments of data points S1-SN 82(1-n) of the chromatogram 85 with timing stamps T1-TN 87(1-n) of cycle events C1-CN 90(1-n) of the analysis cycle 92 in accordance with an exemplary embodiment of the present invention. A segment of data points S1 82(1) is associated with a timing stamp T1 87(1) of a cycle event C1 90(1) of the analysis cycle 92. Likewise, a segment of data points SN 82(n) is associated with a timing stamp TN 87(n) of a cycle event CN 90(n) of the analysis cycle 92. For example, time-stamped event messages M1-MN 200(1-n) may be used for annotation.

Figure 3:
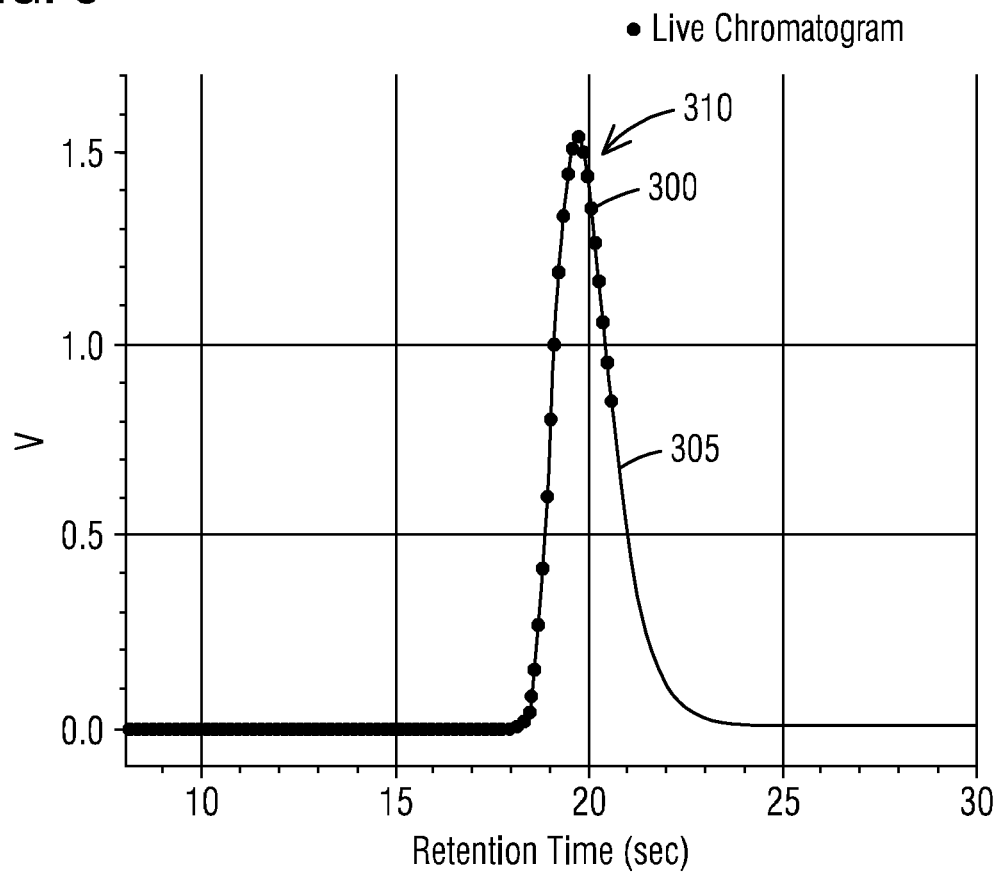
FIG. 3 illustrates an exemplary graphical plot of a chromatogram from the process gas chromatograph of FIG. 1 in accordance with an exemplary embodiment of the present invention.

Turning now to FIG. 3, it illustrates an exemplary graphical plot of a live real-time chromatogram (dots) 300 from the process gas chromatograph of FIG. 1 in accordance with an exemplary embodiment of the present invention. The live real-time chromatogram (dots) 300 is shown overlaid with a previously acquired reference chromatogram (line curve) 305, being zoomed into a peak region 310. A cycle time may be very long (e.g. 3600 s) and there may be many peaks in a single chromatogram (e.g. 20).

Time-stamped asynchronous messaging makes it possible for the overlaid chromatogram display with accurate chromatogram timing without negatively impacting gas chromatograph (GC) hardware timing for machine control and chromatogram data acquisition. Multiple real-time chromatogram displays (either on a workstation PC or HMI on a GC analyzer) may be registered to listen and receive time-stamped asynchronous messages for real-time chromatogram displays.

Developing an optimized chromatography method for acquiring a chromatogram that is optimized for a chromatography analysis requires iterative testing and adjustment of method parameters with many cycles of analysis. Time-stamped asynchronous messaging for the live real-time chromatogram 300 with an overlay is especially important for the early stages of a method development where next iteration of method parameter adjustment may be done early based on partial real-time chromatogram data received so far without having to wait until the end of the cycle, thereby speeding up a method development process.

Figure 4:
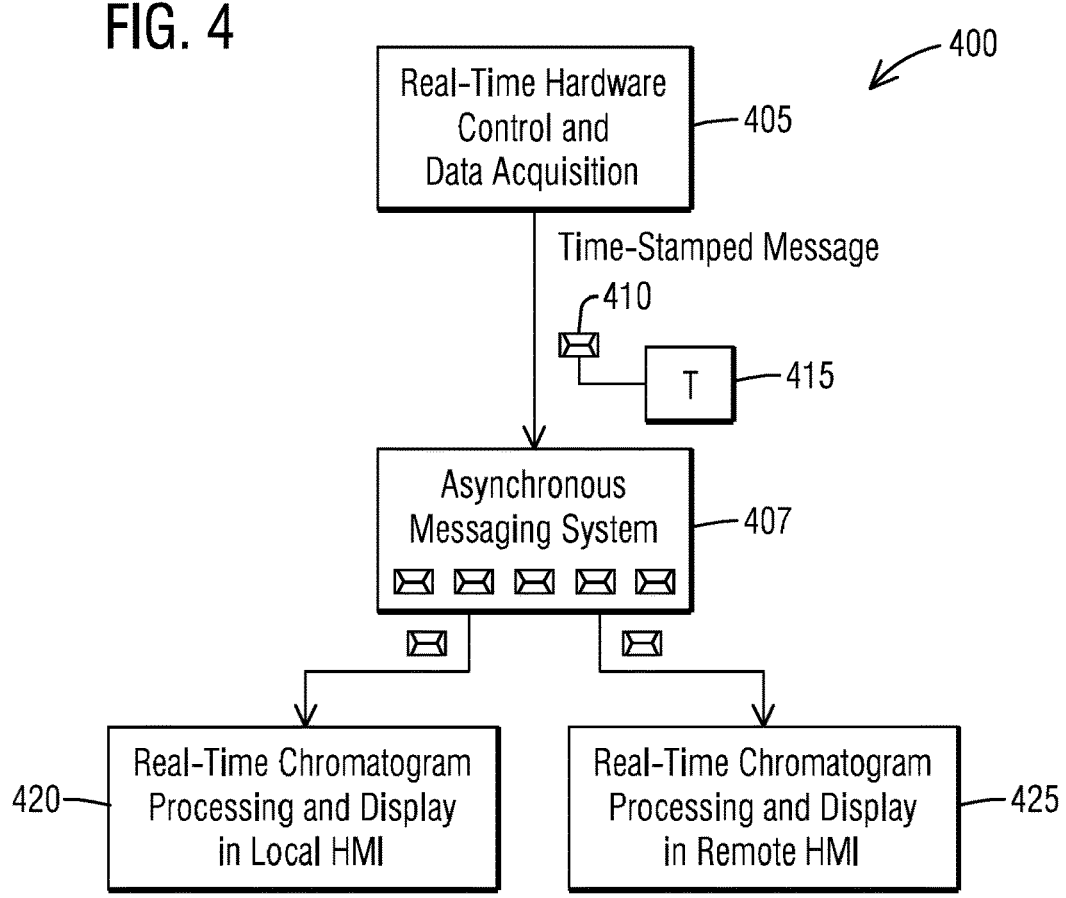
FIG. 4 illustrates a simplified schematic block diagram of a system for acquiring and displaying a real-time chromatogram in accordance with an exemplary embodiment of the present invention.

FIG. 4 illustrates a simplified schematic block diagram of a system 400 for acquiring and displaying a real-time chromatogram in accordance with an exemplary embodiment of the present invention. The system 400 comprises a real-time hardware control and data acquisition system 405 coupled to an asynchronous messaging system 407. The real-time hardware control and data acquisition system 405 is configured for real-time chromatogram acquisition. The real-time hardware control and data acquisition system 405 communicates the real-time chromatogram information to the asynchronous messaging system 407.

The real-time software module 70 annotates the real-time chromatogram information and the associated real-time chromatogram cycle event information using a time-stamped asynchronous event message 410 in a manner which has a minimal impact on the critical real-time activity related to chromatogram acquisition and instrument control. The real-time software module 70 publishes in real-time each cycle event of the cycle events C1-CN 90(1-$n$) of the analysis cycle 92 and each segment of the segments of data points S1-SN 82(1-$n$) of the chromatogram 85 as the message 410 stamped with an event time or a data acquisition time (T) 415 to the asynchronous messaging system 407.

The real-time software module 70 uses a message passing technique to send the message 410 to the asynchronous messaging system 407 and relies on to the asynchronous messaging system 407 and the supporting infrastructure to select and invoke the actual code to run. Message passing is a form of communication between objects, processes or other resources used in object-oriented programming, inter-process communication and parallel computing. Message passing can be synchronous or asynchronous. Each message contains data marshaled in a mutually agreed upon format, and each message is intercepted as a request or response according to a protocol. The function of a message passing system is to allow processes to communicate with one another without the need to resort to shared data. Messages sent by a process can be of either fixed or variable size. Processes P and Q may communicate by sending messages to each other and receiving messages from each other over a communication link. This communication link may be implemented in a variety of ways for the send/receive operation, for example, via a direct or indirect communication, symmetric or asymmetric communication, automatic or explicit buffering, send by copy or send by reference, and fixed sized or variable sized messages.

Message passing differs from conventional programming where a process, subroutine, or function is directly invoked by name. Message passing is key to some models of concurrency and object-oriented programming. Message passing is used ubiquitously in modern computer software. It is used as a way for the objects that make up a program to work with each other and as a way for objects and systems running on different computers (e.g., the Internet) to interact. Message passing may be implemented by various mechanisms, including channels. Message passing is a technique for invoking behavior (i.e., running a program) on a computer. In contrast to the traditional technique of calling a program by name, message passing uses an object model to distinguish the general function from the specific implementations. The invoking program sends a message and relies on the object to select and execute the appropriate code.

The asynchronous messaging system 407 receives the time-stamped event messages 410 asynchronously. Synchronous message passing occurs between objects that are running at the same time, while with asynchronous message passing it is possible for the receiving object (the asynchronous messaging system 407) to be busy or not running when the requesting object (the real-time software module 70) sends the message 410. Asynchronous message passing uses additional capabilities for storing and retransmitting data for systems that may not run concurrently. Asynchronous message passing is generally implemented so that all the complexities that naturally occur when trying to synchronize systems and data are handled by an intermediary level of software. The intermediate level software is usually called "middleware". One of the most common types of middleware to support asynchronous messaging is called Message-Oriented Middleware (MOM).

With asynchronous message passing, the real-time software module 70 does not wait for a response. Using the function call analogy, asynchronous message passing would be a function call that returns immediately, without waiting for the called function to execute. Such an asynchronous function call would merely deliver the arguments, if any, to the called function, and tell the called function to execute, and then return to continue its own execution. Asynchronous message passing simply sends the message 410 to a message bus. The message bus stores the message 410 until the asynchronous messaging system 407 requests messages 410 sent to it. When a receiving process arrives at the result, it sends the result to the message bus, and the message bus holds the message 410 until the original process (or some designated next process) picks up its messages from the message bus.

In one embodiment, the real-time software module 70 may use a message queue paradigm being a sibling of the publisher/subscriber pattern, which is typically one part of a larger message-oriented middleware system. Most messaging systems support both the publisher/subscriber and message queue models in their API, e.g. Java Message Service (JMS). The message queues and mailboxes are software-engineering components used for inter-process communication (IPC), or for inter-thread communication within the same process. They use a queue for messaging—the passing of control or of content. Group communication systems provide similar kinds of functionality.

Message queues provide an asynchronous communications protocol, meaning that the sender and receiver of the message 410 do not need to interact with a message queue at the same time. Messages 410 placed onto the queue are stored until the recipient retrieves them. Message queues have implicit or explicit limits on the size of data that may be transmitted in a single message and the number of messages that may remain outstanding on the queue.

In one exemplary message-queueing implementation, a system administrator installs and configures a message-queueing software (a queue manager or broker), and defines a named message queue. Or they register with a message queuing service. An application then registers a software routine such as the non-real-time software display module 77 that "listens" for messages placed onto the queue of the asynchronous messaging system 75. Second and subsequent applications may connect to the queue and transfer a message 410 onto it. The queue-manager software stores the messages until a receiving application connects and then calls the registered software routine. The receiving application then processes the message in an appropriate manner.

The system 400 further comprises a real-time chromatogram processing and display system 420 in local HMI and/or a real-time chromatogram processing and display system 425 in remote HMI. The display system 420 and/or 425 to display a partial data points of the segments of data points S1-SN 82(1-$n$) of the chromatogram 85 as soon as they are being acquired.

Figure 5:
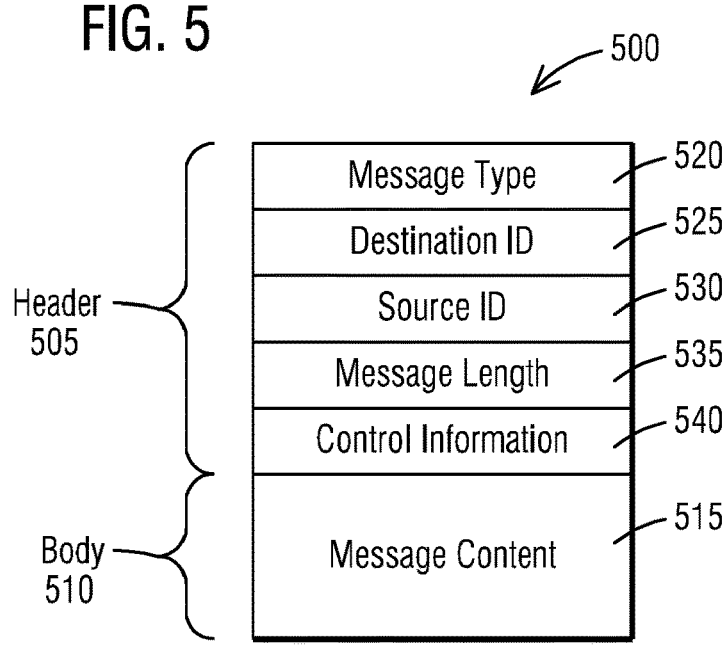
FIG. 5 illustrates a schematic of an exemplary format of a time-stamped event message with details of its contents in accordance with an exemplary embodiment of the present invention.

As shown in FIG. 5, it illustrates a schematic of an exemplary format of a time-stamped event message 500 with details of its contents in accordance with an exemplary embodiment of the present invention. The time-stamped event message 500 comprises a header 505 and a body 510. The body 510 includes a message content 515. The header 505 includes a message type 520, a destination ID 525, a source ID 530, a message length 535 and control information 540.

As seen in FIG. 6, it illustrates a flow chart of a method 600 of acquiring and displaying the real-time chromatogram 85 of FIG. 2 from the process gas chromatograph 10 of FIG. 1 using the time-stamped asynchronous event messages 410 in accordance with an exemplary embodiment of the present invention. Reference is made to the elements and features described in FIGS. 1-5. It should be appreciated that some steps are not required to be performed in any particular order, and that some steps are optional.

The method 600 includes, in step 605, generating the chromatogram 85 of a sample such as the gas mixture 65. The method 500 additionally includes, in step 610, acquiring the segments of data points S1-SN 82(1-$n$) of the chromatogram 85 in real-time. The method 600 in addition includes, in step 615, annotating in real-time the segments of data points S1-SN 82(1-$n$) of the chromatogram 85 with the T1-TN 87(1-$n$) of cycle events C1-CN 90(1-$n$) of the analysis cycle 92 using the time-stamped asynchronous event messages 410. The method 600 further includes, in step 620, receiving the time-stamped asynchronous event messages 410 asynchronously. The method 600 further includes, in step 625, displaying each cycle event of the cycle events C1-CN 90(1-$n$) of the analysis cycle 92 and each segment of the segments of data points S1-SN 82(1-$n$) of the chromatogram 85 in a display module such as the display 80 as being received.

In accordance with one embodiment of the present invention, the method 600 further includes publishing in real-time each cycle event of the cycle events C1-CN 90(1-$n$) of the analysis cycle 92 and the each segment of the segments of data points S1-SN 82(1-$n$) of the chromatogram 82 as the message 410 stamped with an event time or a data acquisition time to the asynchronous messaging system 75. The method 600 further includes registering a non-real-time software display module as a message listener to the asynchronous messaging system 75. The method 600 further includes receiving the message 410 asynchronously at the non-real-time software display module.

According to one embodiment of the present invention, the method 600 further includes processing the each cycle event of the cycle events C1-CN 90(1-$n$) of the analysis cycle 92 and each segment of the segments of data points S1-SN 82(1-$n$) of the chromatogram 85 for displaying a partial data points of the segments of data points of the chromatogram 85. The method 600 further includes displaying the partial data points of the segments of data points S1-SN 82(1-$n$) of the chromatogram 85 as soon as they are being acquired such that cycle event timings in a chromatographic method be changed, as needed, to prepare for a next analysis cycle.

In one embodiment, the method 600 further includes using the time-stamped asynchronous messages 410 for acquiring and displaying the chromatogram 85 and for acquiring and displaying other types of real-time data such as at least one of real-time temperature and real-time pressure profiles. The method 600 further includes overlaying real-time data of the at least one of the temperature and pressure profiles with real-time data of the chromatogram to provide additional information for optimizing a chromatographic method such as temperature and pressure programming.

The techniques described herein can be particularly useful for using a gas chromatograph (GC) analyzer. While particular embodiments are described in terms of a thermal conductivity detector, the techniques described herein are not limited to the thermal conductivity detector but can also use other category of detectors suitable for chromatography (e.g. Flame Ionization, Photo Multiplier, etc. . . . ).

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method of acquiring and displaying a cycle-based real-time chromatogram for process gas chromatographs, the method comprising:
   generating the cycle-based real-time chromatogram of a sample;
   acquiring segments of the chromatogram in real-time;
   annotating in real-time the segments of the chromatogram with timing stamps of cycle events of an analysis cycle;
   sending the time-stamped chromatogram segments and cycle events using messages;
   receiving the messages asynchronously;
   processing the messages, assembling and storing the information for display;
   displaying all the cycle events of the analysis cycle and all the segments of data points of the chromatogram in a display module as it is being received in real-time;
   overlaying a previously acquired reference chromatogram in the display module to visually compare the data of the cycle events received in real-time against the previously acquired reference data.

2. The method of claim 1, further comprising:
   publishing in real-time all the cycle events of the analysis cycle and all the segments of data points of the chromatogram as a message stamped with an event time or a data acquisition time to an asynchronous messaging system.

3. The method of claim 2, further comprising:
registering a non-real-time software display module as a message listener to the asynchronous messaging system.

4. The method of claim 3, further comprising:
receiving the message asynchronously at the non-real-time software display module.

5. The method of claim 4, further comprising:
processing all the cycle events of the analysis cycle and all the segments of data points of the chromatogram for displaying a partial data points of the segments of data points of the chromatogram.

6. The method of claim 5, further comprising:
displaying the partial data points of the segments of data points of the chromatogram as soon as they are being acquired such that cycle event timings in a chromatographic method be changed, as needed, to prepare for a next analysis cycle.

7. The method of claim 1, further comprising:
using time-stamped asynchronous messages for acquiring and displaying the chromatogram and for acquiring and displaying other types of real-time data such as at least one of real-time temperature and real-time pressure profiles.

8. The method of claim 7, further comprising:
overlaying real-time data of the at least one of the temperature and pressure profiles with real-time data of the chromatogram to provide additional information for optimizing a chromatographic method such as temperature and pressure programming.

9. A chromatograph for gas chromatographic analysis of a sample, comprising:
a separating device having a downstream detector, the sample being conveyed by a carrier gas through the separating device, the detector delivering a chromatogram of the sample; and
an evaluation device coupled to the detector, the evaluation device having a chromatographic software module including a real-time software module for a data acquisition system coupled to an asynchronous messaging system and a non-real-time software module for a chromatogram display,
wherein the data acquisition system is configured for acquiring segments of data points of the chromatogram in real-time and the real-time software module is configured for annotating in real-time the segments of data points of the chromatogram with timing stamps of cycle events of an analysis cycle,
wherein the real-time software module is configured for sending in real-time each cycle event of the cycle events of the analysis cycle and each segment of the segments of data points of the chromatogram as a message stamped with an event time or a data acquisition time to the asynchronous messaging system, the non-real-time software module is registered to receive the asynchronous messages, and
wherein the non-real-time software module processes the asynchronous messages as they are received, assembling and storing the chromatogram and cycle events information received so that it can be displayed, and
wherein the non-real-time software module retrieves the information received and displays the chromatogram and cycle event information reflecting the current state of a partial cycle in progress, and
wherein the non-real-time software module presents a previously acquired reference chromatogram as an overlay, used to visually compare the data of the cycle in progress against the previous data such that cycle event timings in a chromatographic method can be changed, to prepare for a next analysis cycle.

10. The chromatograph of claim 9, wherein the non-real-time software module to receive the message asynchronously.

11. The chromatograph of claim 9, wherein the non-real-time software module to process the each cycle event of the cycle events of the analysis cycle and each segment of the segments of data points of the chromatogram for displaying the partial data points of the segments of data points of the chromatogram.

12. The chromatograph of claim 9, wherein the evaluation device is configured to use time-stamped asynchronous messages for acquiring and displaying the chromatogram and for acquiring and displaying other types of real-time data such as at least one of real-time temperature and real-time pressure profiles.

13. The chromatograph of claim 12, wherein the evaluation device is configured to overlay real-time data of the at least one of the temperature and pressure profiles with real-time data of the chromatogram to provide additional information for optimizing a chromatographic method such as temperature and pressure programming.

14. The chromatograph of claim 9, wherein the non-real-time software module is a local Human Machine Interface (HMI).

15. The chromatograph of claim 9, wherein the non-real-time software module is a remote Human Machine Interface (HMI).

16. A chromatograph for gas chromatographic analysis of a sample, comprising:
a real-time software module for a data acquisition system coupled to an asynchronous messaging system, wherein the data acquisition system is configured for acquiring segments of data points of a chromatogram in real-time and wherein the real-time software module is configured for annotating in real-time the segments of data points of the chromatogram with timing stamps of cycle events of an analysis cycle using time-stamped messages; and
a non-real-time software module being a display module, wherein the non-real-time software module is configured to receive the time-stamped event messages asynchronously from the asynchronous messaging system, process the time-stamped messages as they are received, assemble and store the information, to be used by the display module,
wherein the display module is configured for displaying each cycle event of the cycle events of the analysis cycle and each segment of the segments of data points of the chromatogram in the display as a partial data points of the segments of data points of the chromatogram in real-time as they are received, and
wherein the cycle event and a partial chromatogram are further overlayed to a previously acquired reference chromatogram, providing a visual point of comparison for preparing optimization of a next analysis cycle.

17. The chromatograph of claim 16, wherein the non-real-time software module is registered as a message listener to the asynchronous messaging system.

18. The chromatograph of claim 16, wherein the real-time software module is configured for publishing in real-time the each cycle event of the cycle events of the analysis cycle and the each segment of the segments of data points of the chromatogram as a message stamped with an event time or a data acquisition time to the asynchronous messaging system.

19. The chromatograph of claim 18, wherein the real-time software module is configured for communicating the each cycle event of the cycle events of the analysis cycle and the each segment of the segments of data points of the chromatogram as the message to the non-real-time software module.

20. The chromatograph of claim 16, wherein the non-real-time software module to enable the display to display the partial data points of the segments of data points of the chromatogram as soon as they are being acquired such that cycle event timings in a chromatographic method be changed, as needed, to prepare for a next analysis cycle.

* * * * *